United States Patent
Lee et al.

(10) Patent No.: US 9,051,179 B2
(45) Date of Patent: *Jun. 9, 2015

(54) CONTINUOUS METHOD AND APPARATUS FOR FUNCTIONALIZING CARBON NANOTUBE

(75) Inventors: Jin Seo Lee, Daejeon (KR); Joo Hee Han, Daejeon (KR); Seung-Hoe Do, Daejeon (KR); Seong Cheol Hong, Daejeon (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 1091 days.

This patent is subject to a terminal disclaimer.

(21) Appl. No.: 12/385,820

(22) Filed: Apr. 21, 2009

(65) Prior Publication Data

US 2009/0269267 A1   Oct. 29, 2009

(30) Foreign Application Priority Data

Apr. 23, 2008 (KR) .................. 10-2008-0037685

(51) Int. Cl.
| | |
|---|---|
| B82Y 30/00 | (2011.01) |
| B01J 3/00 | (2006.01) |
| B82Y 40/00 | (2011.01) |
| C01B 31/02 | (2006.01) |

(52) U.S. Cl.
CPC ............... B82Y 30/00 (2013.01); B01J 3/008 (2013.01); B82Y 40/00 (2013.01); C01B 31/0273 (2013.01); C01B 2202/28 (2013.01)

(58) Field of Classification Search
CPC .. C01B 31/026; C01B 31/0213; C01B 31/022
USPC ............... 423/447.1, 460, 445 R, 445 B, 445, 423/447.8; 977/842, 847, 742, 745, 700, 977/735, 750; 428/408
See application file for complete search history.

(56) References Cited

U.S. PATENT DOCUMENTS

| | | | |
|---|---|---|---|
| 8,212,132 B2* | 7/2012 | Swager et al. | 568/584 |
| 8,841,454 B2* | 9/2014 | Habeeb | 546/113 |

(Continued)

FOREIGN PATENT DOCUMENTS

| | | |
|---|---|---|
| CN | 1532144 | 9/2004 |
| JP | 2005-501789 | 1/2005 |

(Continued)

OTHER PUBLICATIONS

Shin et al., "Tailoring Electronic Structures of Carbon Nanotubes by Solvent with Electron-Donating and -Withdrawing Groups," 2008, J. Am. Chem. Soc., 130, pp. 2062-2066.*

(Continued)

*Primary Examiner* — Guinever Gregorio
(74) *Attorney, Agent, or Firm* — Clark & Brody

(57) ABSTRACT

A continuous method for functionalizing a carbon nanotube includes preparing a carbon nanotube solution containing a nitro compound represented by chemical formula 1 as R—(NOx)y wherein R is an alkyl group of C1 to C7 or an aryl group of C6 to C20 and x and y are integers of 1 to 3 independently, a carbon nanotube and a solvent. An oxidizer for forming a nitric acid selected from the group consisting of the carbon nanotube, oxygen, air, ozone, hydrogen peroxide and a mixture thereof is mixed with the carbon nanotube solution at a front end of a functionalizing reactor and the carbon nanotube mixture is fed into the functionalizing reactor. A functionalized carbon nanotube is prepared by treating the carbon nanotube mixture fed into the functionalizing reactor under a subcritical water or supercritical water condition of 50 to 400 atm.

10 Claims, 5 Drawing Sheets

(56) References Cited

U.S. PATENT DOCUMENTS

| | | | |
|---|---|---|---|
| 2004/0223900 A1* | 11/2004 | Khabashesku et al. | 423/447.1 |
| 2006/0097228 A1 | 5/2006 | Lee et al. | |
| 2006/0239891 A1* | 10/2006 | Niu et al. | 423/445 R |
| 2010/0065776 A1* | 3/2010 | Han et al. | 252/182.3 |
| 2011/0053050 A1* | 3/2011 | Lim et al. | 429/524 |
| 2012/0183468 A1* | 7/2012 | Farrell et al. | 423/415.1 |
| 2012/0183770 A1* | 7/2012 | Bosnyak et al. | 428/367 |
| 2013/0072669 A1* | 3/2013 | Wang et al. | 536/23.1 |

FOREIGN PATENT DOCUMENTS

| | | |
|---|---|---|
| JP | 2005-263607 | 9/2005 |
| KR | 10-2001-0102598 | 11/2001 |
| KR | 10-0450029 | 9/2004 |
| KR | 10-2005-0009711 | 1/2005 |
| KR | 10-2005-0016640 | 2/2005 |
| KR | 10-2007-0114553 | 12/2007 |
| WO | 2007/008581 | 1/2007 |

OTHER PUBLICATIONS

K. Park et al., "Progressive and invasive functionalization of carbon nanotube sidewalls by diluted nitric acid under supercritical conditions", *J. Mater. Chem.*, 2005, 15, 407-411.

Kritzer, P., "Corrosion in high-temperature and supercritical water and aqueous solutions: a review" (2004) *Journal of Supercritical Fluids*, vol. 29, pp. 1-29.

\* cited by examiner

CONTINUOUS METHOD AND APPARATUS FOR FUNCTIONALIZING CARBON NANOTUBE

TECHNICAL FIELD

The present invention relates to a continuous method and apparatus for functionalizing a carbon nanotube, and more specifically, to a continuous method and apparatus for functionalizing a carbon nanotube under a subcritical water or supercritical water condition using a nitro compound oxidizer so as to improve dispersibility.

BACKGROUND ART

A structure of a carbon nanotube (hereinafter, referred to as CNT) was first found in 1991. Synthesis, physical property, and application of the carbon nanotube have been actively studied. Also, it has been confirmed that the CNT is produced by adding transition metals, such as ferrum (Fe), nickel (Ni), cobalt (Co), etc., at the time of discharging electricity. A full study started from a preparation of a significant amount of samples by a laser evaporation method in 1996. The CNT takes a form of a round wound hollow tube whose graphite surface is a diameter of a nano size. At this time, the CNT has electrical characteristics, such as conductivity, semi-conductivity, etc., according to the wound angle and structure of the graphite surface. Moreover, the CNT is divided into a single-walled carbon nanotube (SWCNT), a double-walled carbon nanotube (DWCNT), a thin multi-walled carbon nanotube, a multi-walled carbon nanotube (MWCNT), and a roped carbon nanotube according to the number of graphite walls.

In particular, the CNT has excellent mechanical strength or elastic strength, chemical stability, eco-friendliness, and electrical conductivity and semi-conductive properties as well as having an aspect ratio larger than existing materials, wherein the aspect ratio reaches about 1,000 as a diameter of 1 nm to several tens nm and a length of several μm to several tens μm. Also, the CNT has a very large specific-surface area. As a result, the CNT is as advanced new materials, which will lead the twenty-first century, in the field of next-generation information electronic materials, high-efficiency energy materials, high-functional complex materials, eco-friendly materials, and the like.

However, in spite of various advantages possessed by the CNT, since the CNT has very large agglomeration phenomenon and very large hydrophobic properties, the CNT is poor in terms of the mixed property with other media. That is it does not have solubility with organic solvents or water. Therefore, in order to expand the applications of the CNT while having the advantages of the CNT, a method capable of increasing compatibility with various media and making dispersion efficiency good is needed. As a technology of increasing the compatibility of CNT, there is a functional group substituting technology capable of providing separate characteristics on a surface, for example, there is a method for increasing the specific-surface area of CNT using strong bases such as potassium hydroxide, sodium hydroxide, etc., under vacuum and inert gas atmosphere as described in KR Patent No. 450,029 and a method for functionalizing a CNT using strong acids or strong bases as described in KR Patent Publication Nos. 2001-102598, 2005-9711, and 2007-114553.

However, since the above technologies use strong acids, such as nitric acid, sulfuric acid, etc., or strong bases, such as potassium hydroxide, sodium hydroxide, etc., they are harmful to environment, are not easy to handle, and can cause the corrosion of a reactor. Further, these technologies need further processes, such as a process of washing used acids and bases, which can cause a large amount of harmful wastes. In addition, since they have long reaction times and limited throughput, the efficiency is low. Also and in order to provide the functional group in addition to oxygen on the surface, they need separate processes that consume time and cost.

In addition, K.R. Patent Publication No. 2005-16640 disclosed a method for preparing a carbon nanotube or a nitrogen-added carbon nanotube by pyrolyzing liquid in a reaction chamber, the liquid including a liquid hydrocarbon precursor of one or more carbon, a liquid compound precursor of carbon atom, nitrogen atom, and optionally hydrogen atom and/or one or more carbon and nitrogen consisting of atoms of other chemical elements such as oxygen, and a metal compound precursor of optionally one or more catalytic metal. However, when preparing the nitrogen-added carbon nanotube, the metal compound precursor is included as a catalyst, such that the catalyst treatment after the reaction is troublesome and it is troublesome to perform the reaction by introducing a specific apparatus due to a use of a needle type valve.

DISCLOSURE OF THE INVENTION

In order to solve the above problems, it is an object of the present invention to provide a continuous method and apparatus for functionalizing a carbon nanotube under subcritical water or supercritical water conditions using a nitro compound without using strong acids or strong bases.

In order to achieve the above object, there is provided a continuous method for functionalizing a carbon nanotube, including: preparing a functionalized product by treating a carbon nanotube solution including nitro compound according to the following chemical formula 1 and a carbon nanotube mixture including an oxidizer for forming a nitric acid under subcritical water or supercritical water condition of 50 to 400 atm.

   [Chemical Formula 1]

wherein Chemical Formula 1, R is alkyl group of C1 to C7 or aryl group of C6 to C20 and x and y are integers of 1 to 3 independently.

Further, the present invention provides a continuously functionalized carbon nanotube according to the above-mentioned method.

Moreover, there is provided a continuous apparatus for functionalizing a carbon nanotube, including: a mixing and feeding part that mixes the nitro compound according to the above chemical formula 1, a carbon nanotube, and a solvent to prepare a carbon nanotube solution and feeds the prepared carbon nanotube solution under high pressure; a preheater that preheats the prepared carbon nanotube solution to a temperature of 100 to 370° C. in the mixing and feeding part; a functionalizing reactor under a subcritical water or supercritical water condition that forms a carbon nanotube mixture by mixing the carbon nanotube solution by the preheater with a oxidizer for forming nitric acid fed under 50 to 400 atm in the front end of the functionalizing reactor and treats the carbon nanotube mixture under 50 to 400 atm; quenching and pH adjusting part that quenches the functionalized product in the functionalizing reactor into a temperature of 200 to 300° C. and at the same time, adjusts pH thereof; a cool down and depressurizing system that cools down and depressurizes the quenched and pH adjusted product into 0 to 100° C. and 1 to 10 atm; and a product storing part that recoveries the product through the cool down and depressurizing system.

Hereinafter, an example of the present invention will be described in detail with reference to the accompanying drawings. First, it is to be noted that like components or parts are denoted by like reference numerals throughout the drawings. In describing the present invention, a detailed description of related known functions or configurations will be omitted so as not to obscure the subject of the present invention.

Terms used in the specification, "about", "substantially", etc., which represent a degree, are used as meanings at numerical values or approaching numerical values when inherent tolerances of preparation and material are present.

FIG. 1 is a process diagram of a continuous apparatus for functionalizing a carbon nanotube according to an example of the present invention. Referring to FIG. 1, a continuous method for functionalizing a carbon nanotube of the present invention may include: a) mixing (S100); b) preheating (S200); c) functionalizing (S300); d) quenching and pH adjusting (S400); e) cooling down and depressurizing (S500); and f) product recovering (S600) The continuous method for functionalizing a carbon nanotube of the present invention may include g) filtering (S510) that filters the product functionalized after the cooling down and depressurizing that is step e) and f) dispersing (S610) that disperses the product of step f).

FIG. 2 is a process diagram of a continuous apparatus for functionalizing a carbon nanotube according to an example of the present invention. Referring to FIG. 2, the continuous apparatus for functionalizing a carbon nanotube of the present invention may include a mixer 100, a preheater 110, a functionalizing reactor 130, a quenching and pH adjusting part 140, a cooling down and depressurizing system 150, and a product storing part 170.

The present invention provides a continuous method for functionalizing a carbon nanotube that mixes a nitro compound according to the following chemical formula 1, a carbon nanotube (CNT), and a solvent to prepare a carbon nanotube solution and feeds the prepared carbon nanotube solution under high pressure in a mixing and feeding part 100, feeds the carbon nanotube solution from the mixing and feeding part 100 to a preheater 110 and preheats the carbon nanotube solution to a temperature of 100 to 370° C. in the preheater 110, treats the carbon nanotube solution including the nitro compound and the carbon nanotube mixture including an oxidizer for forming nitric acid by feeding the oxidizer for forming nitric acid under 50 to 400 atm in the front end of the functionalizing reactor 130 in a functionalizing reactor under a subcritical water or supercritical water condition of 50 to 400 atm, and quenches and neutralizes them in the quenching and pH adjusting part.

First, a) the mixing step that prepares the carbon nanotube (CNT) solution including the nitro compound by feeding the nitro compound according to the following chemical formula 1, the carbon nanotube (CNT), and the solvent into the mixing and feeding part 100 and mixing them by a circulation pump 11 can be performed.

[Chemical Formula 1]

wherein Chemical Formula 1, R is alkyl group of C1 to C7 or aryl group of C6 to C20 and x and y are integers of 1 to 3 independently.

The nitro compound is more preferably nitromethane, nitroethane, or more preferably, nitropropane.

The nitro compound is included in the CNT solution including the nitro compound as a molar ratio of 0.0001 to 1 with respect to the CNT. If the nitro compound is below 0.001 molar ratios, an oxidation effect is deteriorated at the time of functionalizing the carbon nanotube, such that there is a risk that dispersibility is not improved. If the nitro compound is above 1 molar ratio, the functionalizing effect corresponding to the exceeded molar ratio can not be obtained, such that raw materials are wasted.

Preferably, the CNT is selected from a group consisting of single-walled, double-walled, thin multi-walled, multi-walled, roped, and a mixture thereof and is used.

Further, the solvent included in the CNT solution including the nitro compound may be selected from a group consisting of water, aliphatic alcohol, carbon dioxide, and a mixture thereof.

The CNT may be prepared to be included in the CNT solution including the nitro compound as 0.0001 to 10 wt %. If the CNT is below 0.0001 wt %, the amount of recovered CNT is too small. If the CNT is above 10 wt %, the viscosity of the CNT solution including the nitro compound is increased, such that it is difficult to feed the CNT solution to the preheater 110.

b) The preheating step (S200) that preheats the CNT solution including the prepared nitro compound in the preheater 110 receiving the CNT solution fed at a pressure of 50 to 400 atm through a high-pressure feeding pump 12 can be performed. The preheating step (S200) is a step of preheating the CNT solution to a temperature of 100 to 370° C. in the preheater 110. This is to constantly maintain a temperature of the functionalizing reactor to be described below by preheating the CNT solution before treating it under the subcritical water or supercritical water condition to be described below.

Therefore, a heat exchanger 13 is located at the front end of the preheater 110 and the heat exchanger performs a role of preheating the CNT solution including the nitro compound. The heat exchanger 13 primarily lowers the temperature before finally cooling down the functionalized product under a subcritical water or supercritical water condition to be described below, which performs a role of preventing energy loss consumed in the cooling down step. If the temperature is below 100° C., the temperature should be raised at the critical condition, such that there is no effect of preventing energy loss. If the temperature is above 370° C., energy loss as a result of raising the temperature above that which is necessary is increased, such that the installation of the heat exchanger is not effective.

When the CNT solution including the nitro compound by the high-pressure feeding pump is fed into the preheater 110, if the pressure is below 50 atm, it is difficult to feed the CNT solution including the nitro compound into the preheater 110 or the functionalizing reactor 130 to be described below and if the pressure is above 400 atm, energy loss is caused due to too high pressure and the functionalized degree is not improved any more in the viewpoint of functionalizing the CNT.

c) The CNT solution including the nitro compound subjected to the preheating step contacts the oxidizer for forming nitric acid fed under 50 to 400 atm by the high-pressure feeding pump 14, the CNT solution including the nitro compound is mixed with the oxidizer for forming nitric acid at the front end of the functionalizing reactor 130, and then the mixture of the CNT solution and the oxidizer for forming nitric acid is transferred to the continuously connected functionalizing reactor 130 and subjected to the functionalizing step (S300) of the carbon nanotube under the subcritical water or supercritical water condition of 50 to 400 atm, thereby making it possible to form the functionalized reaction product.

The oxidizer for forming nitric acid may be selected from oxygen, air, ozone, hydrogen peroxide, and a mixture thereof and may be included in the CNT solution as 0.001 to 10 molar ratio with respect to the nitro compound. After the oxidizer for forming nitric acid and the nitro compound are mixed, the CNT is oxidized by nitric acid instantly generated in the functionalizing reactor 130 and functionalized to have polarity, thereby increasing the dispersibility of the CNT. Therefore, if the oxidizer for forming nitric acid is fed below 0.001 molar ratio with respect to the nitro compound, a degree of converting the nitro compound into the nitric acid is low and the functionalized degree is low accordingly, such that the dispersibility is not improved and if the oxidizer for forming nitric acid is above 10 molar ratio, the CNT is damaged due to excessive oxidation reaction. Further, it is preferable that the temperature of the mixture under the subcritical water or supercritical water condition is 100 to 600° C.

The pressure under the subcritical water condition is preferably 50 to 260 atm, more preferably, 60 to 260 atm. In addition, the temperature is preferably 100 to 380° C., more preferably, 200 to 350° C. At this time, the functionalization is preferably performed for 1 to 30 minutes, more preferably, 5 to 15 minutes.

Meanwhile, the pressure under the subcritical water condition is preferably 150 to 400 atm, more preferably 210 to 300 atm. In addition, the temperature is preferably 350 to 600° C., more preferably, 370 to 500° C. At this time, the functionalization is preferably performed for 1 to 30 minutes, more preferably, 5 to 15 minutes The CNT mixture in the functionalizing reactor 130 instantly forms nitric acid by reacting the nitro compound with the oxidizer for forming nitric acid under the subcritical water or supercritical water condition, thereby making it possible to perform the functionalization of CNT. Herein, it is more preferable to use oxygen as the oxidizer for forming nitric acid. An oxidation reaction formula between oxygen and nitro compound is represented below.

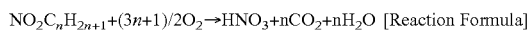

$$NO_2C_nH_{2n+1}+(3n+1)/2O_2 \rightarrow HNO_3+nCO_2+nH_2O \quad \text{[Reaction Formula]}$$

The above reaction formula 1 represents an example of a reaction formula that forms nitric acid of 1 mole under the subcritical water or supercritical water condition by reacting nitroalkyl compound of 1 mole with oxygen of $(3n+1)/2$ mole.

Under the subcritical water or supercritical water condition, the CNT solution including the nitro compound and the CNT mixture including the oxidizer for forming nitric acid are completely mixed and the instantly generated nitric acid is rapidly penetrated between CNT particles agglomerated in the CNT mixture at a high diffusion speed, thereby making it possible to uniformly oxidize the CNT surface. Therefore, under the subcritical water or supercritical water condition, the penetration of the oxidizer is excellent to progress the oxidation reaction more uniformly and rapidly, thereby improving the functionalized effect. The subcritical water or supercritical water condition, which is an optional condition for adjusting a functionalized degree, means the temperature or pressure condition for water.

Therefore, if the pressure is below 50 atm or the temperature is below 100° C. when performing the functionalization, the oxidation reaction speed is slowed such that the functionalization is not performed well, thereby deteriorating the dispersibility. If the pressure is above 400 atm or the temperature is above 600° C., energy loss is caused which raises the pressure and the corrosion of the reactor and the CNT can be damaged.

In particular, if the CNT is functionalized under the subcritical condition, a higher dispersibility characteristic is exhibited in water or organic solvent and if the CNT is functionalized under the supercritical condition, even though a smaller amount of nitro compound and the oxidizer for forming nitric acid than under the subcritical water condition are used, the functionalized effect is similar to the functionalized effect under the subcritical water condition.

d) The quenching (rapid cooling) and pH adjusting step (S400) may be performed on the functionalized product in the quenching and pH adjusting part 140. This is to quench the functionalized product because the corrosion of the reactor increases (reference document J. of Supercritical Fluids 29(2004) 1-29) into a temperature 300 to 400° C. and at the same time, to adjust pH of the functionalized product to be in the range of 5.6 to 8.0 because there is a problem of waste water treatment at the time of discharging the functionalized product, when the functionalized product is acidified due to the formed nitric acid.

Any basic compounds that can neutralize the acidification state can be used as the pH adjuster. Preferably, the pH adjuster is selected from a group consisting of ammonia water, sodium hydroxide, calcium bicarbonate, potassium hydroxide, and a mixture thereof and adjusts pH of the functionalized product to be in the above-mentioned range.

The pH adjuster is fed into the quenching and pH adjusting part at a rear end of the functionalizing reactor 130 to quench the functionalized product between 200 to 300° C. and at the same time, the pH adjuster is fed by the pH adjuster high-pressure feeding pump 15 to control pH.

Thereafter, a heat source for the heat exchanger 13 that was installed at the front end of the preheater 110 and used for preheating the CNT solution, that is, the functionalized and pH adjusted product transferred from the quenching and pH adjusting part 140 is reused to primarily cool down to be in a temperature of 100 to 200° C., thereby making it possible to prevent energy loss.

e) The functionalized product subjected to the functionalizing step can be subjected to the cooling down and depressurizing (S500) that cools them to between 0 to 100° C. and depressurizes them to between 1 and 10 atm.

The functionalized product is primarily cooled down by the heat exchanger 13 and subjected to cooling down to between 0 and 100° C. by a cooling down system 16. It is more preferable to adjust the cooling down temperature to between 20 and 50° C.

The product cooled down by the cooling down system 16 is transferred to the cool down and depressurizing system 150 and can be subjected to depressurizing to between 1 and 10 atm. The depressurizing step is performed by first maintaining the cooled state of the product as it is, reducing the pressure to between 10 and 100 atm by a capillary depressor in the cool down and depressurizing system 150, and then finally depressurizing them to between 1 and 10 atm by a pressure controlling system 17.

f) The product subjected to the cooling down and depressurizing can be finally subjected to the step of recovering the product in the product storing part 170. Therefore, the functionalized carbon nanotube solution of the present invention completes and the product recovering step (S600) can be performed.

g) The product can be recovered in a solution form as it is and used, but can be recovered in a powder form and used. In order to recover the CNT in the powder form, the filtering (S510) that filters the product under a high pressure after the cooling down and depressurizing can be further included.

FIG. 3 is a process diagram of a continuous apparatus for functionalizing a carbon nanotube including a filtering system of a carbon nanotube according to an exempt example of the present invention. Referring to FIG. 3, in order to obtain the functionalized carbon nanotube product in a powder state, filtering parts 210 and 230 that are connected in parallel with high-pressure filters having a pore size of 0.001 to 10 µm and operated in a switching manner so as to filter the functionalized and cooled product in the apparatus of FIG. 2 may be further included. Filtrates 211 and 231 and functionalized CNT filtering products 213 and 233 are transferred to be separated from each other by the filtering parts 210 and 230 and the filtrates 211 and 231 are depressurized into a normal temperature and normal pressure state by a filtering pressure controlling system 21, are transferred to a filtrate storing part 300, and then are discharged. The filtering part can be located in parallel in more than one according to required capacity.

In detail, when the functionalized CNT solution is separated into the functionalized CNT filtering product and the filtrate by the filtering parts 210 and 230 connected to each other in parallel, if the pressure is applied to the filtering part 210, a valve is closed and the filtering part 230 is opened to filter the functionalized and cooled down product and at the same time, to recover the functionalized CNT filtering product 213 in the filtering part 210, and the filtrate 211 is transferred and discharged to the filtrate storing part 300.

In the method as described above, if the pressure is applied to the filtering part 230, the valve is closed and the filtering part 210 is opened by switching to filter the continuously functionalized and cooled down product and to recover the functionalized CNT filtering product 233 in the filtering part 230 and a process of transferring and discharging the filtrate 231 to the filtrate storing part 300 is repeated to alternately filter the filtrate 231 in a switching manner, thereby performing the functionalization continuously.

Therefore, when the filtrates 211 and 231 that are separated and transferred by the filtering parts 210 and 230 are acidified due to the nitric acid formation, the pH adjuster is added from the quenching and pH adjusting part 140 at the rear end of the h) Further, the functionalized, cooled down and depressurized product or the functionalized, filtered CNT product in the filtering step can be further subjected to the dispersing step (S610).

In detail, the CNT product in a liquid phase obtained by functionalizing, cooling down and depressurizing of step f) or the CNT product obtained by functionalizing and filtering of step g), that is, the recovered product can be further subjected to step h) of dispersing the product.

The equipment for dispersing may be selected from a group consisting of ultrasonic wave, homogenizer fluidizer, pulverizer, bead mill, and paint shaker.

Herein, the recovered product may be dispersed in wart or organic solvent that is dispersion solvent and may be included as 0.00001 to 10 wt %.

The organic solvent may be selected from a group consisting of alcohol, ketone, amine, alkyl halogen, ether, furan, solvent containing sulfur, hydrocarbon, and a mixture thereof. If the content of the product dispersed in the dispersion solvent is below 0.00001 wt %, it is difficult to estimate the improved effect of dispersibility by the functionalization and if the content of the product is above 10 wt %, it is difficult to perform the effective dispersion due to the increase in viscosity in the dispersion process.

As described above, the continuous method for functionalizing a carbon nanotube according to the present invention can provide easiness of reaction by continuously performing the functionalization under the subcritical water or supercritical water condition using the nitro compound without additional processes.

Further, even though the acidic reaction solution is prepared by the reaction with the oxidizer for forming nitric acid, the acidic reaction solution is neutralized by adding the pH adjuster during the discharging process without additional processes for neutralizing it, such that the process can be shortened. Moreover, even though the discharged solution is discharged as it is, it is harmless to environment.

DETAILED DESCRIPTION OF MAIN ELEMENTS

Figure 1:
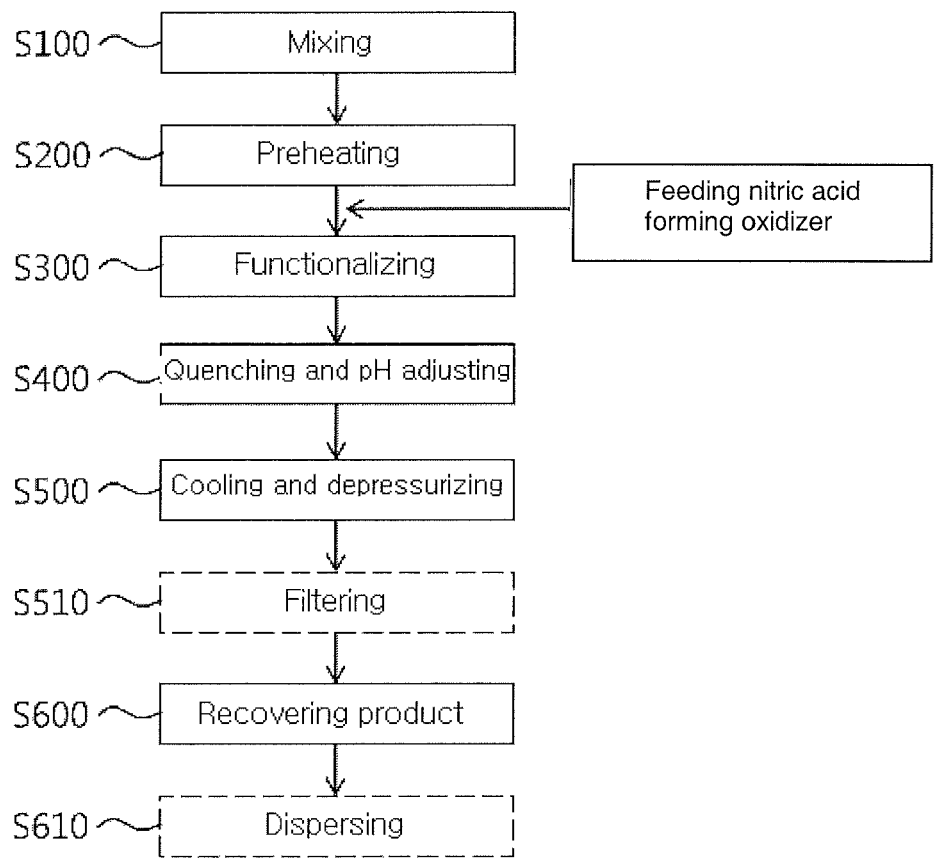
FIG. 1 is a diagram showing a process for a continuously functionalizing a carbon nanotube according to an example of the present invention.

11: CIRCULATION PUMP
12: CNT HIGH-PRESSURE FEEDING PUMP
13: HEAT EXCHANGER
14: OXIDIZER HIGH-PRESSURE FEEDING PUMP
15: pH ADJUSTER HIGH-PRESSURE FEEDING PUMP
16: COOLING DOWN SYSTEM
17: PRESSURE CONTROLLING SYSTEM
21: FILTERING PRESSURE CONTROLLING SYSTEM
100: MIXING AND FEEDING PART
110: PREHEATER
130: FUNCTIONALIZING REACTOR
140: QUENCHING AND pH ADJUSTING PART
150: COOLING DOWN AND DEPRESSURIZING SYSTEM
170: PRODUCT STORING PART
210,230: FILTERING PART
211, 231: FILTRATE
213,233: FUNCTIONALIZED AND FILTERED CNT PRODUCT
300: FILTRATE STORING PART

BEST MODE FOR CARRYING OUT THE INVENTION

The present invention will be described in detail with reference to the following examples.

Example 1

While a multi-walled carbon nanotube of 10 g and a distilled water of 977.8 g were put in a mixing and feeding part 100 and then agitated, nitromethane of 12.2 g (0.2M) is added thereto and they were circulated by a circulation pump 11, such that a CNT solution including the nitro compound was prepared. After the CNT solution was put to the preheater 110 under a flow rate of 30 g/min by a high-pressure feeding pump 12, the CNT solution was preheated into a temperature of 220 to 260° C. by a heat exchanger 13. Thereafter, oxygen in a gas state compressed into 245 to 252 atm formed a CNT mixture mixed with the CNT solution at a flow rate of 0.4 g/min at a front end of a functionalizing reactor 130.

The CNT mixture was fed into the functionalizing reactor 130 in a supercritical water state of a temperature of 330 to 360° C. and 230 to 250 atm and the oxygen reacted with the nitromethane in the CNT mixture, such that the CNT is functionalized while instantly forming nitric acid by passing through a reaction path of a reaction formula 1.

$$NO_2CH_3 + 2O_2 \rightarrow HNO_3 + CO_2 + H_2O \quad \text{[Reaction Formula 1]}$$

Ammonia water was fed into a quenching and pH adjusting part 140 at a flow rate of 0.23 g/min by a pH adjuster high-pressure feeding pump 15 for the quenching and pH adjusting at a rear end of the functionalizing reactor 130. The fed ammonia water contacted the functionalized product and they were quenched into a temperature of 200 to 250° C. and at the same time, pH thereof becomes 7.

The functionalized, quenched and pH adjusted product was transferred back to the heat exchanger 13 and primarily cooled down to 170° C., cooled down into a temperature of 26° C. by a cooling system 15, and depressurized to 2 atm in a cooling down and depressurizing system 150, thereby preparing the functionalized carbon nanotube product in a liquid state. The prepared functionalized carbon nanotube product was stored in a product storing part 170. The continuously functionalized product of 9.0 g was obtained.

Example 2

Figure 2:
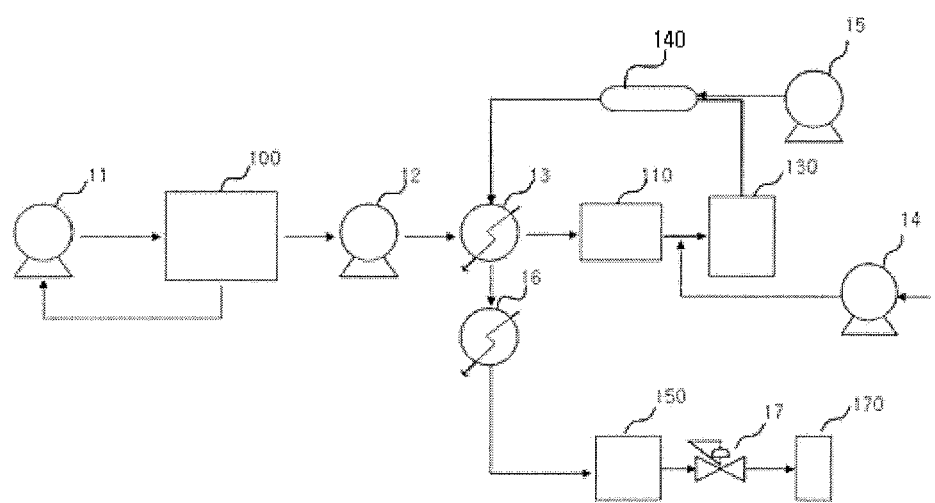
FIG. 2 is a process diagram of a continuous apparatus for functionalizing a carbon nanotube according to an example of the present invention.
Figure 3:
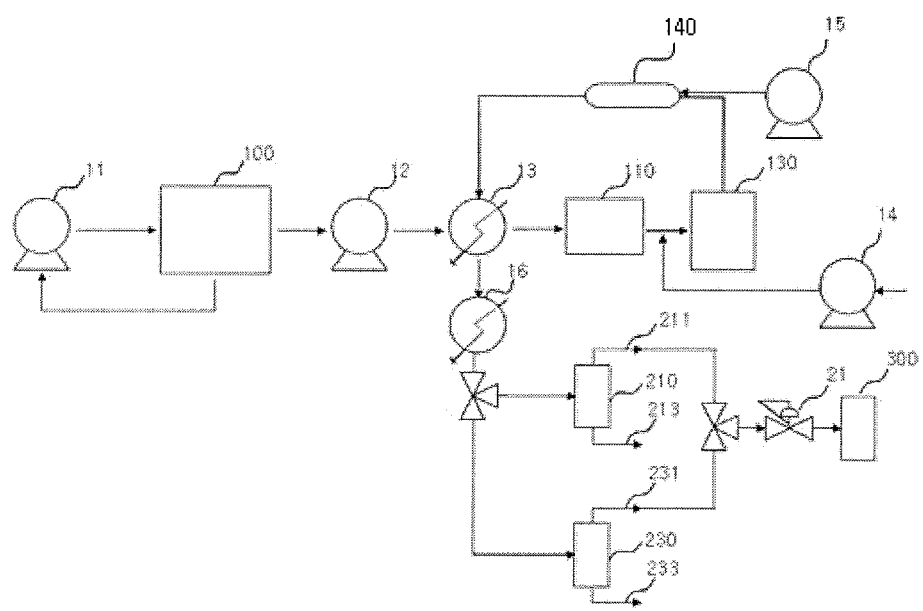
FIG. 3 is a process diagram of a continuous apparatus for functionalizing a carbon nanotube including a filtering system of a carbon nanotube according to an example of the present invention.

After the functionalization was performed in the same manner as example 1, the filtering was performed by using the continuous apparatus for functionalizing including the filtering part of FIG. 2 and the high pressure filter having pore size of 0.001 to 10 μm, thereby obtaining the functionalized CNT product of 9.0 g

Example 3

The functionalized CNT product of 8.9 g was obtained by performing the reaction in the same manner as Example 1 except for preheating it to between 350 and 370° C. and the functionalizing under the supercritical condition of a temperature of 400 to 450° C. and a pressure of 230 to 250 atm.

Comparative Example 1

The reaction was performed in the same manner as Example 1 without feeding the nitromethane and the oxidizer for forming nitric acid.

Comparative Example 2

The reaction was performed in the same manner as Example 2 without feeding the nitromethane and the oxidizer for forming nitric acid.

* Test Method
1. Infrared Spectroscopy (FT-IR Spectroscopy)

A sample for analysis was prepared by drying moisture in a vacuum drying oven, mixing with potassium bromide (KBr), agitating in pestle porcelain, thereby forming a tablet and measured using Model No. 4100 by Varian Co.

Figure 4:
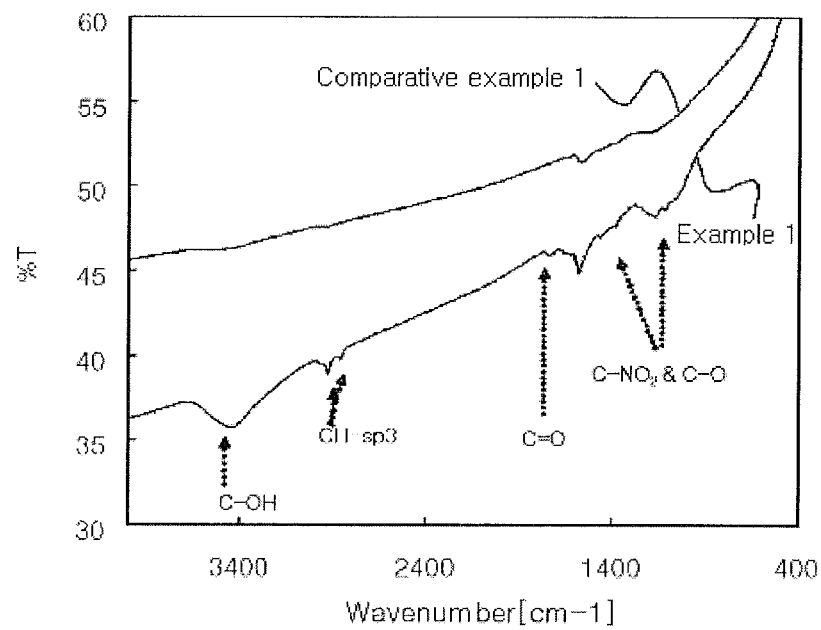
FIG. 4 is a diagram showing an infrared spectroscopy result of a functionalized carbon nanotube according to Example 1 and Comparative Example 1 of the present invention.

FIG. 4 is a diagram showing an infrared spectroscopy result of a functionalized carbon nanotube according to Example 1 and Comparative Example 1 of the present invention. Referring to FIG. 4, it can be confirmed that the peak of the functionalized functional group compared to Comparative Example 1 that functionalization is done. The functionalized structure obtained from the measurement result is a hydroxy group, an alcohol group, a carboxylic acid group, a ketone group, an ether group, a CH-sp3 group, and a nitro group.

2. Raman Spectroscopy

As LABMAN HR model by Jobin-Yvon Co., an apparatus using a 800 nm focal length monochromator and a light source having argon ion laser 514.532 nm wavelength was used. As the sample, powders obtained by drying moisture in a vacuum drying oven, were used.

Figure 5:
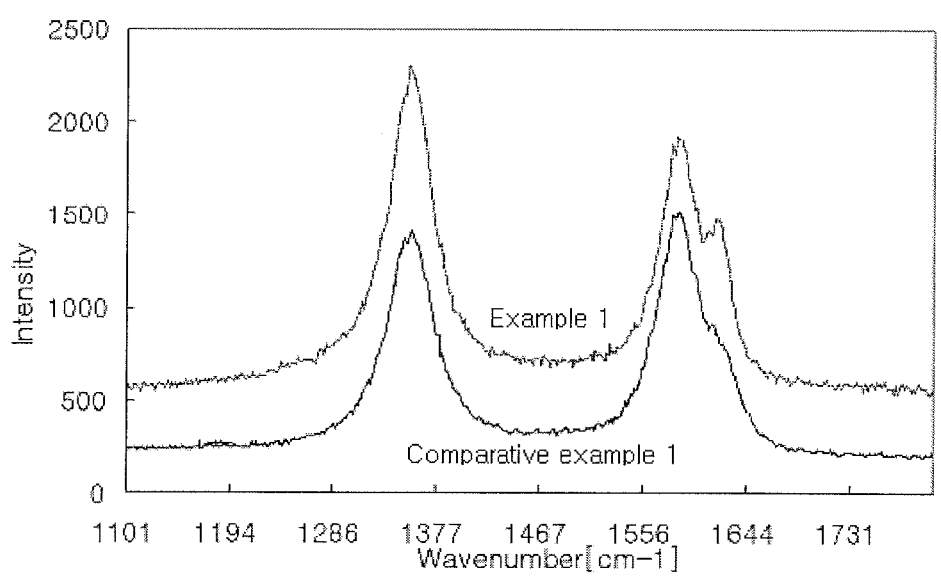
FIG. 5 is a diagram showing a Raman spectrum result of a functionalized carbon nanotube according to Example 1 and Comparative Example 1 of the present invention.

FIG. 5 is a diagram showing a Raman spectrum result of a functionalized carbon nanotube according to Example 1 and Comparative Example 1 of the present invention. Referring to FIG. 5, it can be confirmed that a peak change of Example 1 exhibits near (G peak) 1580 cm$^{-1}$ compared to Comparative Example 1 and thus, a surface is oxidized. The changed peak exhibits at 1620 cm$^{-1}$ peak (D' peak). The ratio of the 1580 cm$^{-1}$ peak to the changed 1620 cm$^{-1}$ peak [R=D' peak area $(A_{D'})$/G peak area $(A_G)$] was calculated through Raman spectrum to estimate the degree of the CNT functionalization.

TABLE 1

| Division | Oxidizer | RAMAN $(A_{D'}/A_G)$ | XPS $(O_{1S}, \text{atom \%})$ | XPS $(N_{1S}, \text{atm \%})$ |
|---|---|---|---|---|
| Example 1 | Nitromethane | 0.225 | 7.48 | 0.50 |
| Example 2 | Nitromethane | 0.228 | 7.50 | 0.49 |
| Example 3 | Nitromethane | 0.252 | 8.40 | 0.66 |

In Table 1, the functionalized degree of the functionalized carbon nanotube is $0.010 \leq A_D/A_G \leq 0.50$ by a Raman spectroscopy and is measured in the range of $0.1 \leq O_{1s}$, atom $\% \leq 30.0$ atom % or $0 \leq N_{1s}$, atom $\% \leq 30$ atom % by an XPS, but in the case of Comparative Examples 1 and 2, it was confirmed that a specific peak of oxygen or nitrogen is not observed.

Figure 6:
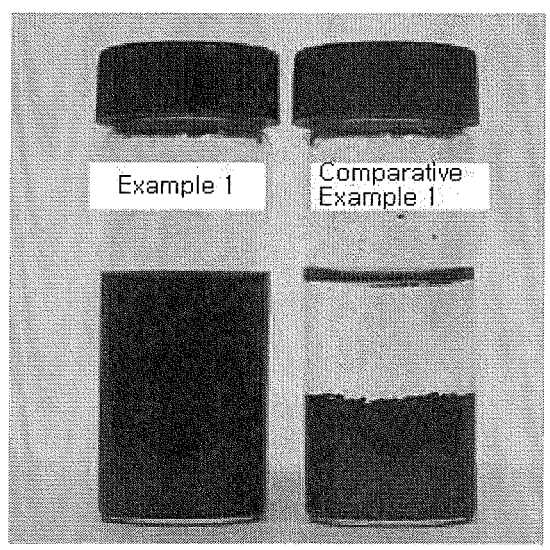
FIG. 6 is a diagram showing a dispersion state of alcoholic organic solvent of a functionalized carbon nanotube according to Example 1 and Comparative Example 1 of the present invention.

FIG. 6 is a diagram showing a dispersion state in alcoholic organic solvent of the functionalized carbon nanotube according to Example 1 of the present invention. Referring to FIG. 6, the dispersion effect is not shown in Comparative Example 1 to sink the CNT, which is not separated from a solvent. The case of Example 1 takes a form that the functionalized carbon nanotube obtained from Example 1 is added by 1 part by weight based on 100 parts by weight of ethylalcohol and dispersed. It can be confirmed that the functionalized carbon nanotube of Example 1 is not sunk and is uniformly dispersed in the dispersion solvent, thereby making it possible to improve the dispersion state by the functionalization.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:
1. A continuous method for functionalizing a carbon nanotube, comprising:
   a) feeding a carbon nanotube solution including a nitro compound represented by a following chemical formula 1, a carbon nanotube and a solvent into a preheater via heat exchanger and then preheating the carbon nanotube solution;

b) feeding a carbon nanotube mixture of the carbon nanotube solution from the step (a) and a oxidizer selected from a group consisting of a oxygen, air, ozone, hydrogen peroxide and a mixture thereof into a functionalizing reactor to obtain a functionalized product and then functionalizing the carbon nanotube in the carbon nanotube mixture at subcritical water or supercritical water condition of 50 to 400 atm, wherein the functionalizing the carbon nanotube is performed by a nitric acid formed by a reaction of the chemical formula 1 and the oxidizer under subcritical water or supercritical water condition;

c) subjecting the functionalized product from the step (b) to a quenching and pH adjusting using a pH adjuster to obtain a quenched and pH adjusted product;

d) cooling down the quenched and pH adjusted product from the step (c) into 0 to 100° C. and then depressurizing the quenched and pH adjusted product into 1 to 10 atm by feeding the quenched and pH adjusted product into a cooling down and depressing part via the heat exchanger of the step (a) while carrying out the process of the step (a); and e) recovering the cooled down and depressurized product;

$$R-(NOx)y \quad \text{[Chemical Formula 1]}$$

wherein R is an alkyl group of C1 to C7 or an aryl group of C6 to C20 and x and y are integers of 1 to 3 independently.

2. The continuous method for functionalizing a carbon nanotube according to claim 1, wherein the carbon nanotube mixture is fed into the functionalizing reactor under a pressure of 50 to 400 atm.

3. The continuous method for functionalizing a carbon nanotube according to claim 1, wherein a temperature under the subcritical water or supercritical water condition is 100 to 600° C.

4. The continuous method for functionalizing a carbon nanotube according to claim 1, wherein a molar ratio of the oxidizer for forming a nitric acid to the nitro compound is 0.001 to 10.

5. The continuous method for functionalizing a carbon nanotube according to claim 1, wherein the solvent is selected from the group consisting of water, aliphatic alcohol, carbon dioxide, and a mixture thereof.

6. The continuous method for functionalizing a carbon nanotube according to claim 1, wherein a molar ratio of the nitro compound to the carbon nanotube included in the carbon nanotube solution is 0.0001 to 1.

7. The continuous method for functionalizing a carbon nanotube according to claim 1,
wherein the preheating of the carbon nanotube solution is to a temperature of 100 to 370° C.

8. The continuous method for functionalizing a carbon nanotube according to claim 1, wherein the recovering of step (e) filters the cooled down and depressurized product to obtain the functionalized carbon nanotube from the cooled down and depressurized product.

9. The continuous method for functionalizing a carbon nanotube according to claim 1, further comprising dispersing the recovered functionalized carbon nanotube in a dispersion solvent.

10. The continuous method for functionalizing a carbon nanotube according to claim 1, wherein the carbon nanotube is selected from the group consisting of single-walled, double-walled, multi-walled, roped, and a mixture thereof.

* * * * *